(12) United States Patent
Kubota et al.

(10) Patent No.: US 6,879,112 B2
(45) Date of Patent: Apr. 12, 2005

(54) IMAGE DISPLAY DEVICE AND METHOD OF DISPLAYING IMAGES WITH STATIC IMAGE DETECTION

(75) Inventors: Hidenao Kubota, Yokohama (JP); Ryo Hasegawa, Yokohama (JP); Junichi Ikoma, Yokosuka (JP); Masahiro Nako, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 10/646,839

(22) Filed: Aug. 25, 2003

(65) Prior Publication Data

US 2004/0251842 A1 Dec. 16, 2004

(30) Foreign Application Priority Data

Jun. 10, 2003 (JP) ........................................ 2003-164515

(51) Int. Cl.⁷ ................................................. G09G 3/10
(52) U.S. Cl. ........................ 315/169.3; 315/308; 345/77
(58) Field of Search ........................... 315/169.2, 169.3, 315/307, 308; 345/76, 77; 348/625, 631, 687, 714

(56) References Cited

U.S. PATENT DOCUMENTS

| | | | | |
|---|---|---|---|---|
| 5,014,116 A | * | 5/1991 | Kawai | ..................... 348/436.1 |
| 5,081,523 A | * | 1/1992 | Frazier | ........................ 348/178 |
| 6,020,687 A | | 2/2000 | Hirakawa et al. | ........... 345/340 |
| 6,313,878 B1 | | 11/2001 | Jankowiak | |
| 6,757,693 B2 | * | 6/2004 | Taniguchi et al. | ....... 707/104.1 |
| 2001/0030513 A1 | | 10/2001 | Takada et al. | ........... 315/169.4 |

FOREIGN PATENT DOCUMENTS

| | | |
|---|---|---|
| JP | 05-344371 | 12/1993 |
| JP | 3115727 | 10/1994 |
| JP | 10-319901 | 12/1998 |
| JP | 11-65541 | 3/1999 |
| JP | P2000-227775 A | 8/2000 |
| JP | 2002-351442 A | 12/2002 |
| WO | WO 02/37842 A1 | 5/2002 |

* cited by examiner

Primary Examiner—Thuy Vinh Tran
(74) Attorney, Agent, or Firm—McDermott Will & Emery LLP

(57) ABSTRACT

An image display device for displaying images by using the digital signal processing and by making use of the sight emission of the phosphor. An static image is detected from an image signal data, and when the luminance level of the static image is high, the luminance level of the specific area is lowered, and when the luminance level of the static image is low, the luminance level of the specific area is increased. In this manner, it is possible to reduce image retention of the static image when the static image is displayed for a long time.

17 Claims, 4 Drawing Sheets

IMAGE DISPLAY DEVICE AND METHOD OF DISPLAYING IMAGES WITH STATIC IMAGE DETECTION

BACKGROUND OF THE INVENTION

The present invention relates to a display device capable of preventing its image retention.

As an image display device for displaying images by making use of the light emission of the phosphor, there is the conventional TV receiver using the cathode ray tube (CRT). In addition to this, there is also a thin flat-type image display device which has been available in recent years, that is, the plasma display panel display device (abbreviated to PDP display device, hereinafter) using the plasma display panel (abbreviated to PDP, hereinafter), which utilizes the light emission of the phosphor excited by the ultra-violet ray in each of the discharge cells, the light emission inducted by the electric discharge of inert gases such as Ne (Neon) and Xe (Xenon), with setting each of the discharge cells arranged in the matrix manner as the unit region. The PDP display device is suitable for a large-sized displaying, and its market has been expanding. Note that the panel structure, the electric discharge mechanism, and the display method of the AC-type PDP are disclosed in, for example, JP-A-10-319901 corresponding to U.S. Pat. No. 6,020,687.

Furthermore, as the thin flat-type image display device utilizing the light emission of the excited phosphor, there is also the FED (Field Emission Display), which utilizes the light emission of the excited phosphor induced by irradiating the electron beam to the phosphor from the electron source in which a large number of electron emitting elements are arranged in a matrix manner (two dimensionally).

Meanwhile, not only the PDP display device but also all image display devices utilizing the light emission of the phosphor has the problem as follows. That is, if the static image with high luminance level is displayed for a long time, the phosphor is degraded, and as a result, the difference in luminance is caused between that part and the other part, that is, a so-called image retention occurs.

For the prevention of the image retention, there is the method as described in JP-A-5-344371, in which, when the displayed image remains unchanged for a predetermined amount of time or more, the image is regarded as a static image, and the luminance level of the entire screen is lowered. In addition, as described in JP-A-2000-227775, there is also the method that when a static image is displayed on the screen for a predetermined amount of time or more, the entire screen is moved by several dots to an almost imperceptible extent.

Furthermore, in the case where both the moving image and the static image are present on the image, there is the method as described in JP-A-2002-351442, in which the static image part is distinguished from the entire screen, and when the static image part remains unchanged for a predetermined amount of time or more, the luminance level only in the static image part is lowered.

SUMMARY OF THE INVENTION

The use of the recent PDP display device has been widespread from the business scene to the household television, and the high-quality image with higher luminance has been demanded in the market. However, the light-emitting efficiency of the PDP display device is not so high as that of the CRT. Therefore, the number of discharge pulses is increased to increase the peak luminance, and thereby achieving the high luminance. For this reason, image retention occurs more frequently in the PDP display device than in the CRT. Moreover, when comparing the FED with the CRT, the acceleration voltage is 10 KV or smaller and the current density is large in the FED, and thus, the phosphor is degraded more quickly. Therefore, similar to the PDP display device, the image retention frequently occurs in the FED.

In this kind of circumstances, when both the moving images and the static images are present in a displayed image and the static images are unevenly distributed on the display screen, that is, the static images are located at specific regions such as the positions around the four corners of the screen, since whether the displayed image is a moving image or a static image is determined in view of the entire image in the methods described in JP-A-5-344371 and in JP-A2000-227775, the displayed image is determined to be the moving image. As a result, the image retention occurs in the parts of the static images.

Furthermore, the method described in JP-A2002-351442 is adapted for the image in which both the moving images and the static images are present. However, it is difficult to determine that the parts around the border between the moving images and the static images are the static images due to the influences from the noises and the like. As a result, the image retention occurs only in the parts around the border.

In consideration of the problems mentioned above, an object of the present invention is to provide an image display device capable of preventing the image retention without degrading the quality of the images.

For the solution of the problems mentioned above, when an image containing static images in the specific regions is inputted, the luminance level in the specific regions is adjusted and then the images in those regions are displayed. In this manner, the image retention in the specific regions is prevented. In addition, the amount of changes in luminance level at this time is controlled so that it gets larger toward the four corners of the screen.

BRIEF DESCRIPTION OF THE DRAWINGS

These and other features, objects and advantages of the present invention will become more apparent from the following description when taken in conjunction with the accompanying drawings wherein.

DESCRIPTION OF THE EMBODIMENTS

While we have shown and described several embodiments in accordance with our invention, it should be understood that disclosed embodiments are susceptible of changes and modifications without departing from the scope of the invention. Therefor, we do not intend to be bound by the details shown and described herein but intend to cover all such changes and modifications a fall within the amabit of the appended claims.

Figure 1:
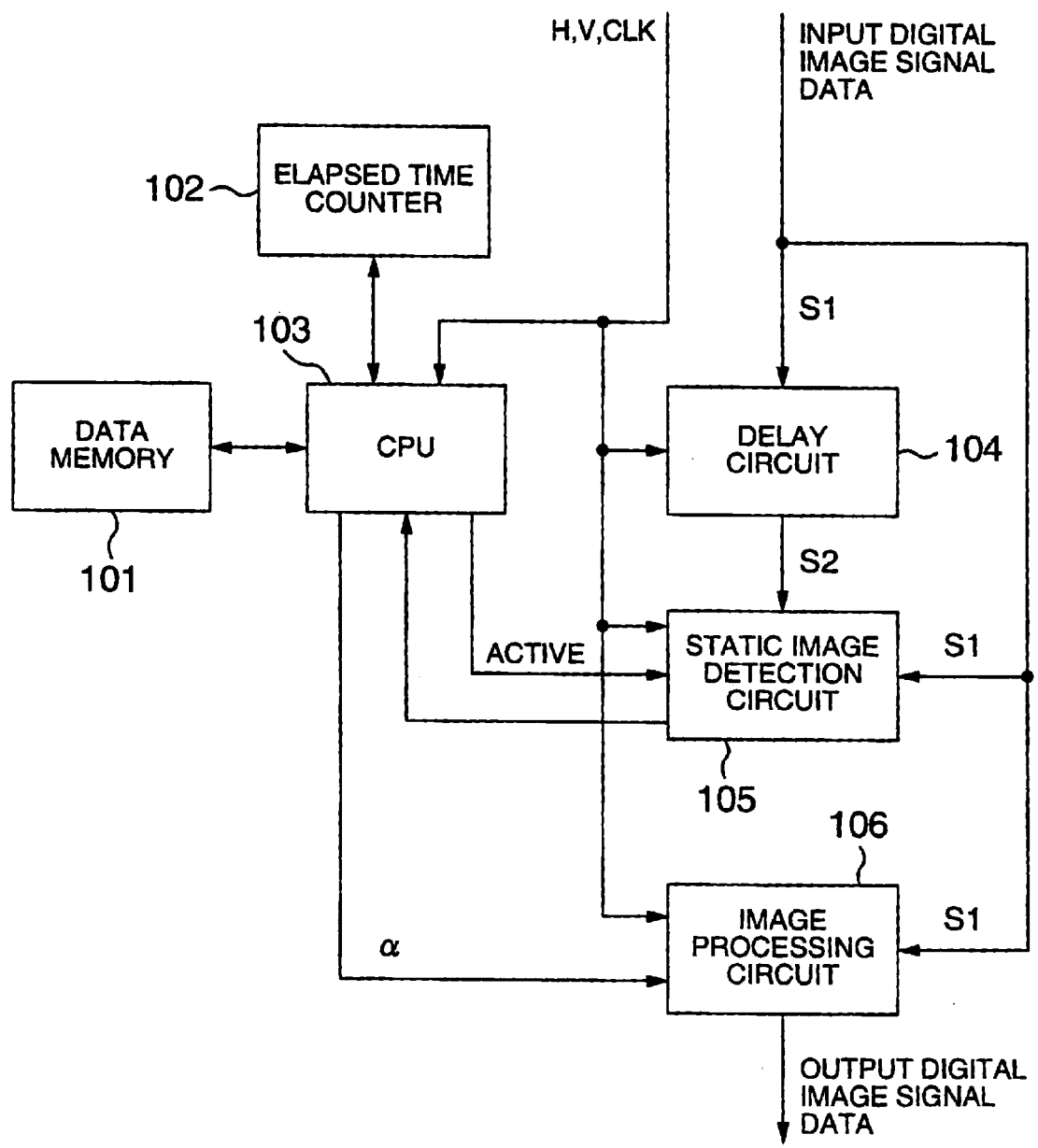
FIG. 1 is a block diagram of an image display device according to an embodiment of the present invention.

In the following, some embodiments of the present invention will be described with reference to the accompanying drawings. FIG. 1 is a diagram showing a block configuration of an image display device in the first embodiment of the present invention.

Figure 2:
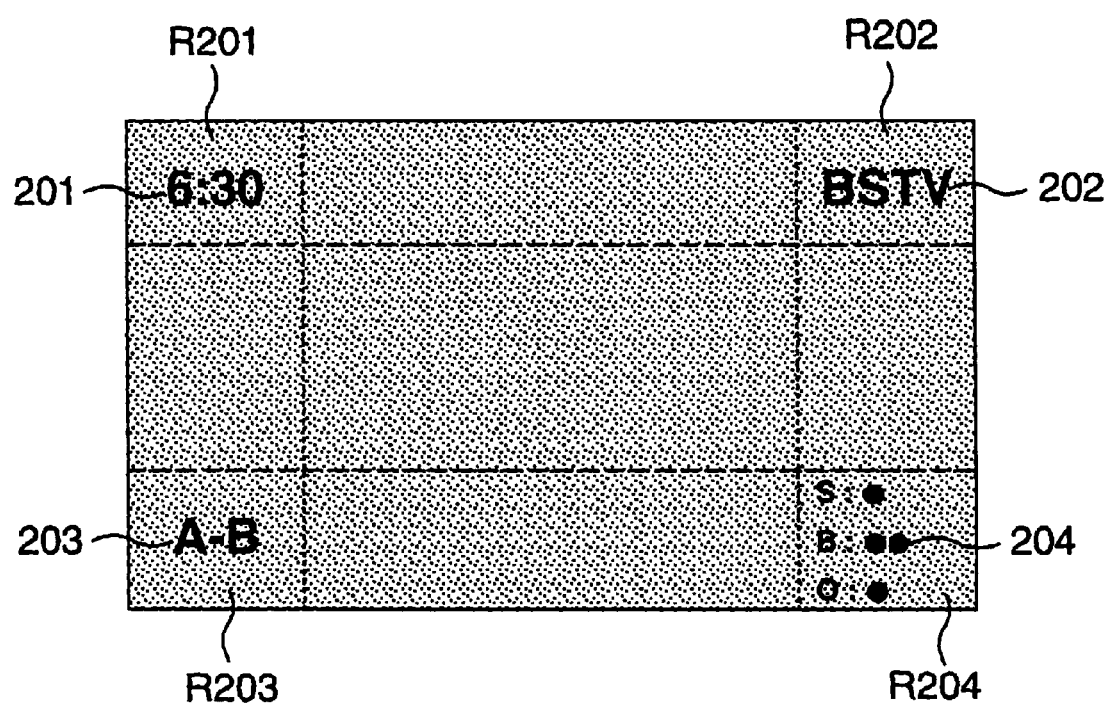
FIG. 2 is a diagram illustrating an example of the image signal data containing the static images, which are mixed in the moving image transmitted from the TV station and are unevenly distributed in the specific regions around the four corners of the display screen.

FIG. 2 is a diagram illustrating an example of the image signal data containing the static images, which are mixed in the moving image transmitted from the TV station and are unevenly distributed in the specific regions around the four corners of the display screen. Almost all of the images transmitted from the TV station are the moving images or the moving images in which the static images are present.

The static images in FIG. 2 includes, for example, the time clock 201, the logo of the broadcasting station 202, and other information displays 203 and 204 such as the index of the TV program (hereinafter, these are generally referred to as telop for the sake of convenience). In many cases, these static images remain displayed for a long time. Furthermore, the investigation by the inventors of the present invention has revealed that these static images are frequently displayed in the specific regions R201, R202, R203, and R204 around the four corners of the display screen not around the center of the display screen as shown in FIG. 2.

In FIG. 1, the reference numeral 101 denotes a data memory in which the luminance correction data (described later) and the like are stored, the reference numeral 102 denotes an elapsed time counter for counting the elapsed time, the reference numeral 103 denotes a system control unit (abbreviated to CPU, hereinafter) such as the microcomputer for controlling the entire system of the image display device, and the reference numeral 104 denotes a delay circuit composed of a memory and the like and functioning to delay the digital image signal data S1, which is the inputted luminance signal, by one field (or by one frame). The reference numeral 105 denotes a static image detection circuit, in which the image level of the digital image signal data S1 and that of the inputted digital image signal data S2 delayed by one field (or by one frame) in the delay circuit 104 are compared, the presence of the static image is detected in each field (or each frame), and then, the detection result is outputted to the CPU 103, and the reference numeral 106 denotes an image processing circuit in which the luminance level of the inputted digital image signal S1 is adjusted by using the luminance correction data α which is outputted from the CPU 103 and stored in the data memory 101.

The CPU 103 can determine the specific regions R201, R202, R203, and R204 set in advance around the four corners of the display screen like those shown as the telops including the time clock 201, the logo 202, and the information displays 203 and 204 in FIG. 2 based on the inputted horizontal synchronization signal H, the vertical synchronization signal V, and the clock signal CLK by the use of the technique described in JP-A-2000-227775. More specifically, the CPU 103 specifies the area in the horizontal direction by counting the clock signal CLK from the start of the horizontal synchronization signal H and also specifies the area in the vertical direction by counting the horizontal synchronization signal H on the basis of the start of the vertical synchronization signal V, thereby determining the specific regions. Then, the CPU 103 outputs the ACTIVE signal to the static image detection circuit 105, by which the static image detection operation in the specific regions by the static image detection circuit 105 is made active.

Next, the operation in FIG. 1 will be described. The inputted digital image signal data S1 is inputted to the static image detection circuit 105 and also to the delay circuit 104, and in the delay circuit 104, the digital image signal data S1 is delayed by one field (or by one frame) and is inputted to the static image detection circuit 105 as the delayed digital image signal data S2.

In the static image detection circuit 105, the luminance level of the image signal data S1 and that of the delayed image signal data S2 are compared to detect the static image, and the detection result is outputted to the CPU 103.

The regions in which the static images are to be detected are the predetermined specific regions (R201 to R204) around the four corners of the display screen, and the CPU 103 can determine the range of the specific regions (R201 to R204) around the four corners of the display screen by the use of the horizontal synchronization signal H, the vertical synchronization signal V, and the clock signal CLK in the manner mentioned above. In addition to the horizontal synchronization signal H, the vertical synchronization signal V, and the clock signal CLK, the CPU 103 outputs the ACTIVE signal to the static image detection circuit 105, by which the static image detection operation in the specific regions is made active.

In these specific regions, the pixels remaining unchanged are judged to be the pixels of the static image, and thus, the static images can be detected. The digital image signal data to be compared at this time is limited to only the part of either of the digital image signal data S1 and S2 (e.g., the digital image signal data S2) having the luminance level higher than the predetermined level. By so doing, it is possible to surely detect the static pixels with high luminance level to be the cause of image retention regardless of the influence from the noise and the like. When the digital image signal is composed of, for example, the 8 bit gradation, the predetermined level can be easily obtained by using the upper 4 bits. When the detection result that the static image is detected in the above-mentioned four specific regions is inputted from the static image detection circuit 105, the CPU 103 starts the counting in the elapsed time counter 102 and continues the counting until the static image detection signal is stopped. The CPU 103 monitors the value of the elapsed time counter 102, and when the value reaches the predetermined value, more specifically, when the static image remains for a predetermined period of time or more, the CPU 103 outputs the luminance correction data stored in the data memory 101 to the image processing circuit 106 in which the luminance level is adjusted, and then lowers the luminance level of the pixels within the specific regions around the corners, in which it is determined that the static image remains for a predetermined period of time or more.

Next, the method of correcting the luminance level of the pixels within the specific regions according to the present invention will be described. The luminance correction data for correcting the luminance of the digital image signal S1 inputted to the image processing circuit 106 is stored in advance in the data memory 101. In this embodiment, this luminance correction data is the luminance weighting factor α (S1) to be multiplied with the luminance of the digital image signal S1, and the image processing circuit 106 multiplies the luminance of the inputted digital image signal S1 with the luminance weighting factor α inputted from the CPU 103 to adjust the luminance.

Figure 3A:
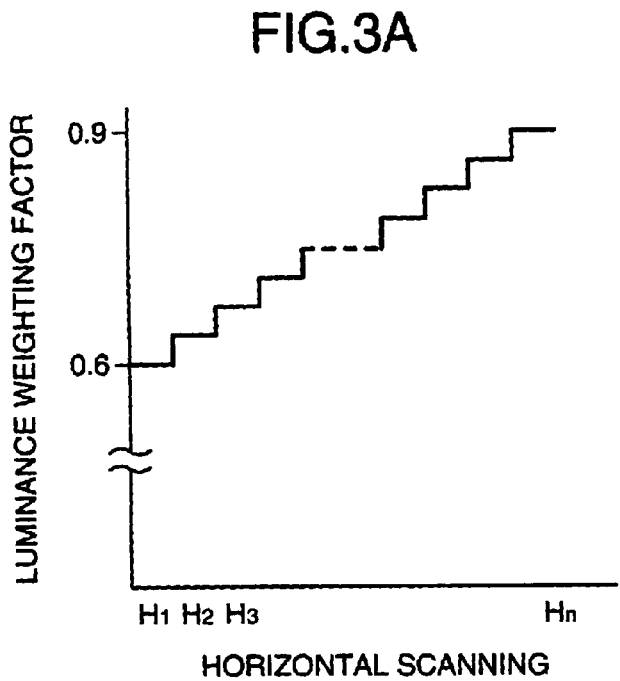
FIGS. 3A and 3B are schematic diagrams for explaining the luminance weighting factor α which is the luminance correction data stored in advance in the data memory.
Figure 3B:
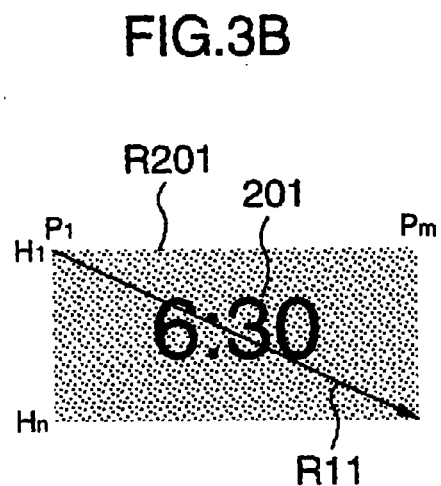

FIGS. 3A and 3B are schematic diagrams for explaining the luminance weighting factor α which is the luminance correction data stored in advance in the data memory 101. For the simplification of the description, the description will be made with taking the specific region R201 in FIG. 2 as an example, in which the time clock 201 serving as the static image is present.

As shown in FIG. 3B, this specific region R201 is represented by the area in which there are the pixels $P_1$ to $P_m$ arranged along the horizontal direction and the horizontal synchronization signals $H_1$, to $H_n$ are arranged along the vertical direction. In such a situation, when the luminance of the specific region R201 with the static image (time clock 201) is lowered in order to prevent the image retention, the luminance level of the specific region R201 is lowered more largely toward the corner of the outer edge of the display screen. FIG. 3A shows the luminance weighting factor along the direction of the arrow R11 in FIG. 3B. In FIG. 3A, the luminance weighting factor α of the pixel $P_m$ close to the center of the display screen is 0.9, and the luminance weighting factor α of the pixel $P_1$ close to the corner is 0.6. The luminance therebetween is linearly changed.

As described above, since the luminance weighting factor α to be the luminance correction data capable of lowering the luminance level more largely toward the outer edge is stored in the data memory 101, the luminance level of the pixels in the specific region R201 around the corner can be lowered more largely toward the outer edges. Therefore, the watcher does not have any uncomfortable feeling. In addition, even if the pixels around the border between the moving image and the static image are not determined to be the pixels of the static image due to the influence from the noise or the like, since the luminance level of all pixels in the specific region R201 is lowered, it is possible to prevent the image retention. In addition, it is also possible to prevent the problem that the luminance balance of the figures each representing the hour, the tens of minutes, and the minutes becomes nonuniform in the time clock 201.

Furthermore, the unnatural change when lowering the luminance level can be reduced by gradually lowering the luminance level in a certain amount of time. For example, when the luminance change along the direction opposite to the arrow R11 in FIG. 3B is mentioned, the luminance of the entire specific region is first lowered to 90% and then the luminance of the pixels $P_{m-1}$ to $P_1$ is lowered by one step, and thereafter, the luminance is sequentially lowered in the same manner at each 0.5 minute along the stair-like steps in FIG. 3A. Alternatively, it is also possible to gradually lower the luminance of the entire specific region in accordance with the luminance weighting factor of each part in the region.

In the foregoing, the case where the luminance level of only the region in which the pixels of the static image are present is lowered has been described. However, the region is not limited to this, and it is also possible to lower the luminance level of all of the specific regions around four corners so as to prevent the unnatural change of the image.

Figure 4:
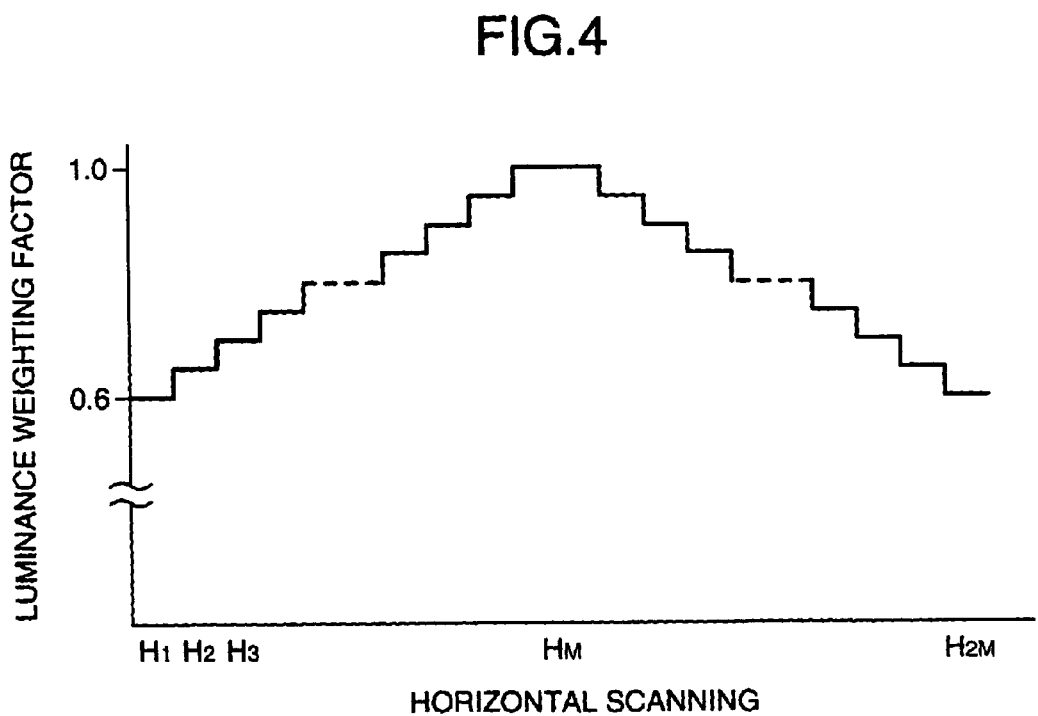
FIG. 4 is a schematic diagram showing another embodiment of the luminance weighting factor α which is the luminance correction data stored in the data memory.

In addition, as a method for reducing the unnatural change in the image caused by lowering the luminance, the luminance level in the entire screen, not only in the specific regions, can be lowered toward the outer edge of the screen. FIG. 4 is a schematic diagram showing an embodiment of the luminance weighting factor α which is the luminance correction data stored in the data memory 101 adapted to this case. In this embodiment, the luminance weighting factor is set so that the luminance is gradually changed from the center portion of the display screen toward the outer edge along the vertical direction.

Judging from the descriptions below, it can be said that the above-mentioned method is applicable. That is, the image with uniform luminance can be displayed on the entire screen of the PDP display device. On the other hand, the luminance around the corners is reduced to 40 to 60% in comparison with that of the center portion in the current flat CRT display. This characteristic is unique to the flat CRT structure. However, the watcher does not have any uncomfortable feeling. Therefore, even if the luminance of the entire screen is adjusted so as to be lower toward the outer edge like in the flat CRT display, the watcher does not have any uncomfortable feeling, and also, the image retention of the static images around the corners can be reduced.

In the foregoing, the case where the luminance weighting factor α is multiplied with the digital image signal S1 in the signal processing circuit 106 to lower the luminance has been described. However, the present invention is not limited to this, and the other method is also available, in which the difference amount of luminance reduction ΔF to be the luminance correction data is stored in advance in the data memory 101, and the difference amount of luminance reduction ΔF is subtracted from the luminance of the digital image signal S1. It is possible to set the difference amount ΔF to a certain value. However, it is more preferable to set the difference amount of luminance reduction ΔF so that the luminance is gradually changed toward the outer edge of the display screen.

Furthermore, in the foregoing, the case where the telops to be the static images unevenly distributed in the specific regions have a high luminance has been described. However, the image retention is usually caused due to the difference in speed of the degradation of the phosphors when the difference in luminance between the pixels of the static image and the pixels around it is large. Therefore, the image retention is also caused when the luminance of the static image is lower than that around it.

In the case where the luminance of the static images unevenly distributed in the specific regions is lower than that around it as described above, the digital image signal data to be compared in the static image detection circuit 105 in FIG. 1 is limited to only the part of either of the digital image signal data S1 and S2 (e.g., the digital image signal data S2) having the luminance level lower than the predetermined level. In this manner, it is possible to detect the static pixels with low luminance level to be the cause of the image retention. Of course, the method is also available, in which the comparison of all pixels within the specific regions is performed to detect the static images, the luminance level of the static images is detected, and then, whether or not the luminance level is lower than a predetermined value is detected.

When the luminance of the static image is lower than the predetermined level, the luminance of the specific region is slightly increased so as to prevent the image retention. In this case, it is possible to evenly increase the luminance. However, it is also possible to set the luminance weighting factor α stored in the data memory 101 in FIG. 1 so as to have the characteristics as shown in FIG. 5, which is opposite to that shown in FIG. 3, with an aim to reduce the unnatural change in the part between the static image and the image around it. More specifically, it is also possible to increase the luminance level more largely toward the corners on the outer edge from the center of the display screen.

Figure 5A:
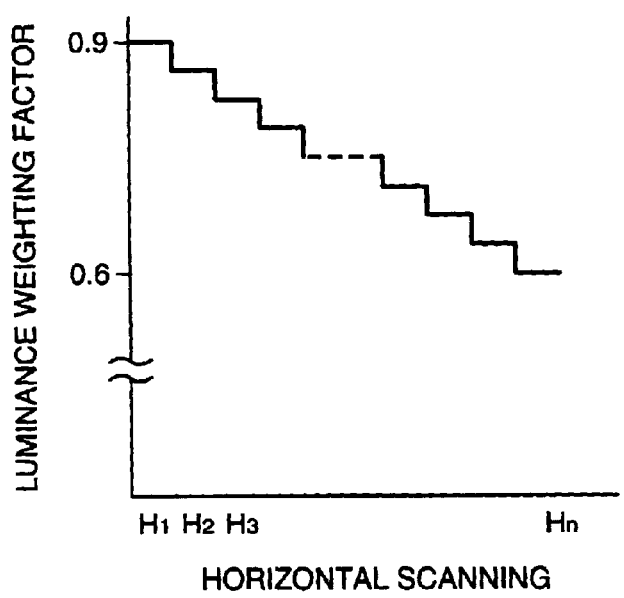
FIGS. 5A and 5B are schematic diagrams for explaining the luminance weighting factor α which is the luminance correction data stored in advance in the data memory.
Figure 5B:
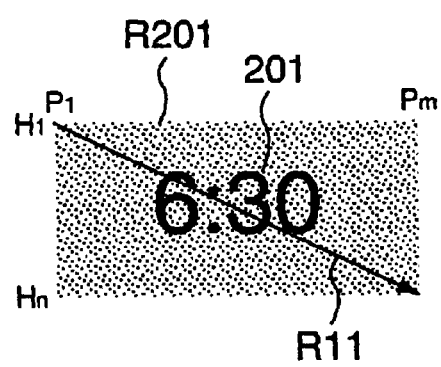

FIGS. 5A and 5B are schematic diagrams for explaining the luminance weighting factor α which is the luminance correction data stored in advance in the data memory 101, and they illustrate an embodiment adapted to the case opposite to that shown in FIGS. 3A and 3B, that is, the case where the luminance of the static image is lower than that around it. The luminance weighting factor α shown in FIGS. 5A and 5B is identical to that shown in FIGS. 3A and 3B except that the luminance weighting factor α shown in FIGS. 5A and 5B has the characteristics opposite to that shown in FIGS. 3A and 3B. Therefore, the detailed description thereof will be omitted.

In the manner described above, when the luminance of the specific region is lower than that around it, the luminance is adjusted in the image processing circuit 106 by the use of the luminance weighting factor α shown in FIGS. 5A and 5B having the characteristic opposite to that shown in FIGS. 3A and 3B.

In the case where, of the specific regions around the four corners, the luminance level of the time clock 201 in the specific region R201 is high in comparison with that around it and the luminance level of the logo in the specific region R202 is low in comparison with that around it, it is needless to say that both the luminance weighting factor in FIGS. 3A and 3B and that in FIGS. 5A and 5B described above can be used together to perform the luminance adjustment so that the luminance level of the time clock 201 in the specific region R201 is lowered and the luminance level of the logo in the specific region R202 is increased. Therefore, the detailed description thereof will be omitted.

Note that the present invention described above can be applied to the image display device for displaying images by the use of the light emission of the phosphor, more particularly, the present invention is ideal for the PDP display device and the FED in which the degradation of the phosphor is more rapid than that in the CRT. However, the application of the present invention is not limited to this, and it is also possible to apply the present invention to the CRT. By so doing, it is possible to provide the image display device in which the quality of the image will not be degraded.

According to the present invention, the display device having improved reliability can be provided.

What is claimed is:

1. A circuit for a display device for displaying images by the use of light emission of phosphors, comprising:
   an input terminal which receives an image signal;
   a detector which detects whether or not a static image is contained in a specific region of an image in the received image signal; and
   an image processor which changes a luminance level of the image in said specific region when the static image is detected by said detector, wherein luminance level of a part of said specific region which will appear close to an edge of a display screen is changed more than a change in luminance level of a part of said specific region which will appear close to a center of the display screen.

2. The circuit according to claim 1, wherein said detector detects a luminance level of the received image signal, and detects the static image with a luminance level higher than a predetermined first luminance level or lower than a predetermined second luminance level.

3. The circuit according to claim 2, wherein said detector detects the luminance level of the received image signal, and when the luminance level of the detected static image in said specific region is higher than said first luminance level, said image processor lowers the luminance level in the specific region.

4. The circuit according to claim 2, wherein said detector detects the luminance level of the received image signal, and when the luminance level of the detected static image in said specific region is lower than said second luminance level, said image processor increases the luminance level in the specific region.

5. The circuit according to claim 1, wherein said image processor changes the luminance level of the image in said specific region when the static image which remains unchanged for a time longer than a predetermined time is received.

6. The circuit according to claim 1, further comprising: a storage which stores data to be used for the change of the luminance level by said image processor.

7. The circuit according to claim 1, wherein said specific region is one of a plurality of regions around four corners of a displayed image.

8. The circuit according to claim 1, wherein said image processor also changes the luminance level of the image in a specific region other than the specific region in which the static image is detected by said detector.

9. The circuit according to claim 1, wherein said image processor gradually increases said amount of change in luminance level in accordance with a passage of time.

10. A circuit for a display device for displaying images by the use of light emission of phosphors, comprising:
    an input terminal which receives an image signal;
    a detector which detects whether or not a static image is contained in a specific region of an image in the received image signal; and
    an image processor which changes a luminance level of the image signal so that luminance level in a part of the image which will appear close to an outer edge of a display screen is changed more than a part of the image which will appear around the center of a display screen across the entire display screen when the static image is detected by said detector.

11. The circuit according to claim 10, wherein said detector detects a luminance level of the inputted image signal, and detects the static image with a luminance level higher than a predetermined first luminance level or lower than a predetermined second luminance level.

12. A display device, comprising:
    a display screen for displaying images by light emission of phosphors;
    an input terminal for receiving an image signal;
    a detector for detecting whether or not a static image is contained in a specific region of an image in the received image signal; and
    an image processor for changing a luminance level of the image in said specific region when the static image is detected by said detector to produce a signal for driving the display screen, wherein luminance level of a part of said specific region which will appear close to an edge of the display screen is changed more than a change in luminance level of a part of said specific region which will appear close to a center of the display screen.

13. The display device according to claim 12, wherein said display screen comprises either a PDP or an FED.

14. A display device comprising:
    a display screen for displaying images by light emission of phosphors;
    an input terminal for receiving an image signal;
    a detector for detecting whether or not a static image is contained in a specific region of an image in the received image signal; and an image processor which changes a luminance level of the image in said specific region when the static image is detected by said detector to produce a signal for driving the display screen, wherein luminance level of a part of said specific region which will appear close to an edge of the display screen is changed more than a change in luminance level of a part of said specific region which will appear close to a center of the display screen across the entire display screen, when the detector detects the static image.

15. The display device according to claim 14, wherein said display device is screen comprises either a PDP or an FED.

16. A method of displaying images on a display screen, comprising:

receiving an image signal;

detecting a static image in a specific region of an image represented by the image signal;

changing a luminance level of a portion of the received image signal corresponding to the specific region of the image; and displaying the image responsive to the signal with the changed luminance level in the portion corresponding to said specific region, wherein luminance level of a part of said specific region which will appear close to an edge of a display screen is changed more than a change in luminance level of a part of said specific region which will appear close to a center of the display screen.

17. A method of displaying images on a display screen, comprising:

receiving an image signal;

detecting a static image in a specific region of an image represented by the image signal;

changing a luminance level of the received image signal so that luminance level in a part of the image which will appear close to an outer edge of the display screen is changed more than a part of the image which will appear around a center of the display screen across the entire display screen, when the static image is detected; and displaying an image with the changed luminance level on the display screen.

* * * * *